United States Patent
Saito et al.

(10) Patent No.: US 6,571,067 B2
(45) Date of Patent: *May 27, 2003

(54) PHOTOGRAPHIC CAMERA SYSTEM

(75) Inventors: Takahiko Saito, Kanagawa (JP); Akira Nakanishi, Tokyo (JP); Shunzi Obayashi, Tokyo (JP); Kyoji Genda, Tokyo (JP); Hideki Toshikage, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/037,235

(22) Filed: Nov. 7, 2001

(65) Prior Publication Data

US 2002/0176710 A1 Nov. 28, 2002

Related U.S. Application Data

(62) Division of application No. 09/627,525, filed on Jul. 28, 2000, now Pat. No. 6,349,176, which is a division of application No. 09/404,878, filed on Sep. 23, 1999, now Pat. No. 6,173,124, which is a division of application No. 08/958,839, filed on Oct. 28, 1997, now Pat. No. 5,978,067, which is a division of application No. 08/645,030, filed on May 15, 1996, now Pat. No. 5,721,991, which is a division of application No. 08/426,113, filed on Apr. 20, 1995, now Pat. No. 5,570,147, which is a division of application No. 08/333,593, filed on Nov. 2, 1994, now Pat. No. 5,625,430, which is a continuation of application No. 08/026,415, filed on Mar. 4, 1993, now abandoned.

(30) Foreign Application Priority Data

Mar. 17, 1992 (JP) .............................................. 4-060684
Mar. 23, 1992 (JP) .............................................. 4-065304

(51) Int. Cl.$^7$ .............................................. G03B 17/24
(52) U.S. Cl. ........................ 396/311; 396/315; 396/318
(58) Field of Search ................................. 396/310, 311, 396/315, 316, 317, 318, 319

(56) References Cited

U.S. PATENT DOCUMENTS

| 2,377,341 | A | 6/1945 | Hannum ......................... 95/31 |
| 3,490,844 | A | 1/1970 | Sapp, Jr. ....................... 355/40 |
| 3,674,365 | A | 7/1972 | Kohler et al. .................. 355/40 |
| 4,080,061 | A | 3/1978 | von Stein et al. ............. 355/38 |
| 4,320,965 | A | 3/1982 | Kimura et al. ................. 355/74 |
| 4,482,924 | A | 11/1984 | Brownstein ................. 358/302 |
| 4,642,700 | A | 2/1987 | Ohta et al. .................. 358/285 |
| 4,645,334 | A | 2/1987 | Shimada et al. .............. 355/40 |
| 4,650,304 | A | 3/1987 | Harvey ......................... 354/21 |

(List continued on next page.)

FOREIGN PATENT DOCUMENTS

EP 0212443 3/1987 ........... G03B/19/00

(List continued on next page.)

OTHER PUBLICATIONS

Fujifilm Advanced Photo System Minilab Guide, Unknown Publication Date.
Kodak Advantix, Internet Informaion found at the Kodak Website, Unknown Publication Date.

*Primary Examiner*—David M. Gray
(74) *Attorney, Agent, or Firm*—Jay H. Maioli

(57) ABSTRACT

A photographic camera system includes a photographic camera that can successively expose a photographic film in different frame sizes and an automatic printer for automatically printing the processed photographic film exposed with those different frame sizes. The camera varies the width of an exposure opening in the camera body in the film-feed direction and the film is fed a length corresponding to the width of the exposure opening. The photographic camera records an exposure opening position signal indicative of the size of the exposure opening on the photographic film, and the automatic printer automatically prints the photographic film using the exposure opening position signal detected from the photographic film.

11 Claims, 13 Drawing Sheets

U.S. PATENT DOCUMENTS

| | | | |
|---|---|---|---|
| 4,693,591 A | 9/1987 | Saijo et al. | 355/41 |
| 4,737,825 A | 4/1988 | Davis | 355/54 |
| 4,777,515 A | 10/1988 | Aikoh et al. | 355/64 |
| 4,860,039 A | 8/1989 | Hata et al. | 354/106 |
| 4,908,641 A | 3/1990 | Fairman | 354/275 |
| 4,931,829 A | 6/1990 | Hakamada | 355/68 |
| 4,965,627 A | 10/1990 | Robison | 355/40 |
| 4,967,266 A | 10/1990 | Yamamoto | 358/76 |
| 4,974,096 A | 11/1990 | Wash | 358/302 |
| 4,977,419 A | 12/1990 | Wash et al. | 354/76 |
| 5,005,031 A | 4/1991 | Kelbe | 354/106 |
| 5,049,908 A | 9/1991 | Murakami | 354/173.1 |
| 5,066,971 A | 11/1991 | Kodaira | 354/465 |
| 5,072,253 A | 12/1991 | Patton | 355/40 |
| 5,086,311 A | 2/1992 | Naka et al. | 354/195.1 |
| 5,151,726 A | 9/1992 | Iwashita et al. | 354/75 |
| 5,229,810 A | 7/1993 | Cloutier et al. | 354/40 |
| 5,245,373 A | 9/1993 | Ogawa et al. | 354/106 |
| 5,258,859 A | 11/1993 | Wada et al. | 358/487 |
| 5,264,683 A | 11/1993 | Yoshikawa | 235/375 |
| 5,270,755 A * | 12/1993 | Ohno et al. | 252/76 |
| 5,274,422 A | 12/1993 | Yoshikawa | 355/77 |
| 5,325,138 A | 6/1994 | Nagata | 354/106 |
| 5,344,730 A | 9/1994 | Kitamoto | 430/14 |
| 5,347,403 A | 9/1994 | Uekusa | 360/3 |
| 5,382,508 A | 1/1995 | Ikenoue | 430/496 |
| 5,410,415 A | 4/1995 | Parulski et al. | 358/403 |
| 5,453,815 A | 9/1995 | Yoshikawa | 355/74 |
| 5,469,209 A | 11/1995 | Gunday et al. | 348/96 |
| 5,471,265 A | 11/1995 | Shibata et al. | 354/76 |
| 5,493,355 A | 2/1996 | Kazami | 354/106 |
| 5,526,255 A | 6/1996 | Shenk | 364/167.1 |
| 5,570,147 A | 10/1996 | Saito et al. | 396/429 |
| 5,583,591 A | 12/1996 | Saito et al. | 396/429 |
| 5,583,610 A | 12/1996 | Yoshikawa | 355/74 |
| 5,600,386 A | 2/1997 | Saito et al. | 396/315 |
| 5,652,643 A | 7/1997 | Saito et al. | 396/311 |
| 5,729,777 A | 3/1998 | Saito et al. | 396/311 |
| 5,742,855 A | 4/1998 | Saito et al. | 396/429 |
| 5,752,114 A | 5/1998 | Saito et al. | 396/429 |

FOREIGN PATENT DOCUMENTS

| | | | | |
|---|---|---|---|---|
| EP | 0357355 | 3/1990 | | G03B/1/02 |
| EP | 0428072 | 11/1990 | | |
| EP | 0476907 | 3/1992 | | H04N/3/15 |
| EP | 0561592 | 9/1993 | | G03B/17/24 |
| JP | 5748729 | 3/1982 | | G03B/27/32 |
| JP | 57048729 | 3/1982 | | G03B/27/32 |
| JP | 01282530 | 11/1989 | | G03B/17/24 |
| JP | 1282530 | 11/1989 | | G03B/17/24 |
| JP | 1282531 | 11/1989 | | G03B/17/24 |
| JP | 1282533 | 11/1989 | | G03B/27/32 |
| JP | 1282536 | 11/1989 | | G03B/27/46 |
| JP | 545714 | 2/1993 | | G03B/17/24 |

* cited by examiner

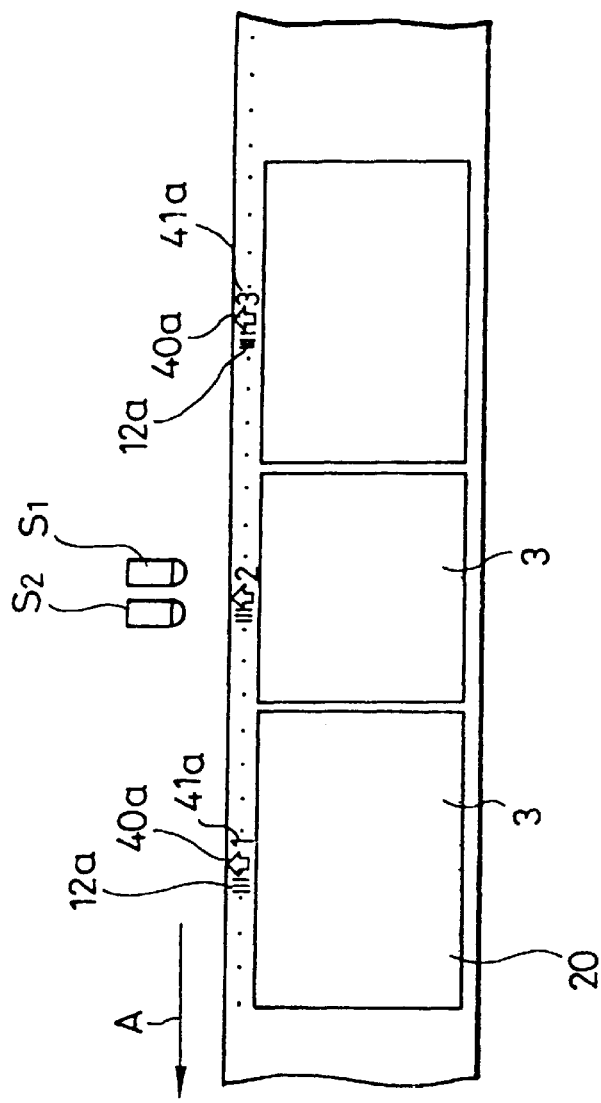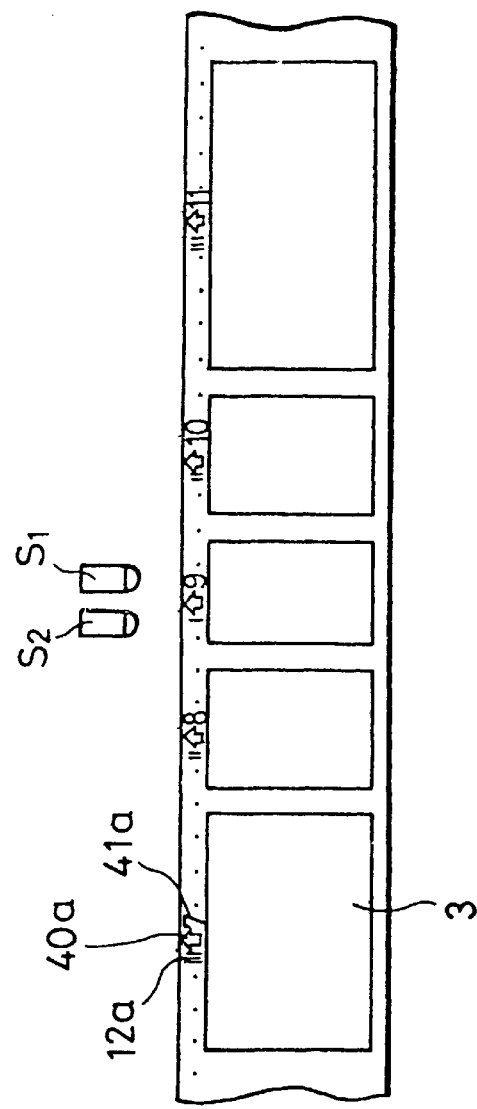
F I G. 12A
F I G. 12B

F I G. 14A
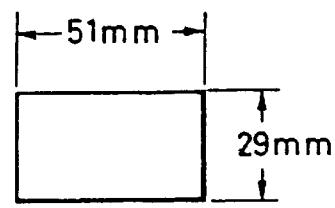
F I G. 14B
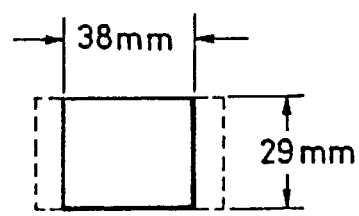
F I G. 15A
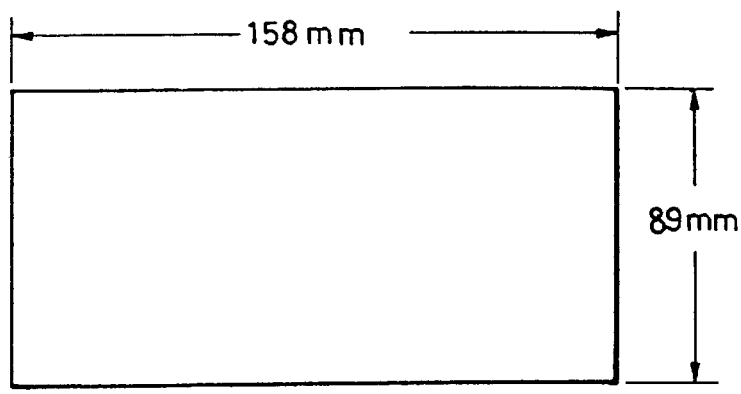
F I G. 15B
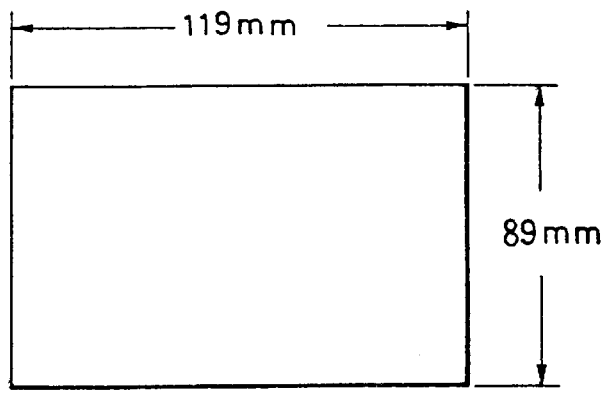

PHOTOGRAPHIC CAMERA SYSTEM

This application is a division of prior application Ser. No. 09/627,525, filed Jul. 28, 2000, now U.S. Pat. No. 6,349,176, which is a division of application Ser. No. 09/404,878 filed Sep. 23, 1999, now U.S. Pat. No. 6,173,124, which is a division of application Ser. No. 08/958,839 filed Oct. 28, 1997, now U.S. Pat. No. 5,978,067, which is a division of application Ser. No. 08/645,030 filed May 15, 1996, now U.S. Pat. No. 5,721,991, which is a division of application Ser. No. 08/426,113 filed Apr. 20, 1995, now U.S. Pat. No. 5,570,147, which is a division of application Ser. No. 08/333,593 filed Nov. 2, 1994, now U.S. Pat. No. 5,625,430, which is a continuation of application Ser. No. 08/026,415 filed Mar. 4, 1993 now abandoned.

BACKGROUND OF THE INVENTION

1. Field of the Invention

The present invention relates to a photographic camera system for producing pictures having various frame sizes, and more particularly to a photographic camera using a specialized photographic film and a film printing device for printing the processed photographic film having a succession of frames of different sizes that have been photographed by the camera.

2. Description of the Background

The photographic film that is in the most widespread use today is 35-mm film (system 135) as provided for by Japanese Industrial Standards (JIS) and International Organization of Standardization (IOS).

U.S. Pat. No. 5,049,908 describes a photographic camera and a film therefor, with the film being of a 35-mm size devoid of sprocket holes of the size used in present 35-mm films and having an effective image area of about 30 mm across the film, thereby providing an increased effective usable film area.

More specifically, ignoring dimensional tolerances, present 35-mm films for use in general photography have a width of 35 mm between opposite longitudinal edges and include a series of film-transport perforations or sprocket holes defined along the opposite longitudinal edges of the film. The film-transport perforations are spaced 25 mm across the film and have a pitch of 4.75 mm. Frames on such a present 35-mm film are of a rectangular shape having a width of 25 mm across the film and a length of 36 mm along the film. The frames have a pitch of 38 mm, which is eight times larger than the pitch of the film-transport perforations.

As described in U.S. Pat. No. 5,049,908, some modern photographic film cameras are electronically controlled to provide motor-driven operation with high accuracy, and it has been experimentally confirmed that the film can be transported quite accurately without requiring the large sprocket wheels and film perforations that are found in most present cameras and films. In the system described in U.S. Pat. No. 5,049,908, the film-transport perforations are not present in the 35-mm photographic film, thereby increasing the available frame width across the film up to the regions where such film-transport perforations were located. The proposed film thus has an increased effective image area for improved image quality. This patent describes four sizes that are available for frames that can be exposed on a 35-mm film free of film-transport perforations.

According to one size, a frame that can be exposed in an effective image area of the 35-mm film has a width of 30 mm across the film and a length of 40 mm along the film. The frames of such a size have a pitch of 42.0 mm, for example. The frame size and pitch are selected to match specifications of the present television broadcasting system, for example, the NTSC system. Therefore, the frames have an aspect ratio of 3:4.

Another frame size described in that patent is based on High-Definition Television (HDTV) specifications, in which frames have a width of 30 mm and a length of 53.3 mm and a pitch of 57.75 mm, for example. The aspect ratio of the frames having that size is 9:16.

The above-mentioned frame sizes are full-frame sizes, and the other two frame sizes are half-frame sizes. According to one of the half-frame sizes, frames have a width of 30 mm and a length of 22.5 mm and a pitch of 26.2 mm, for example, to match present television broadcasting system specifications. According to the other half-frame size, frames have a width of 30 mm and a length of 16.9 mm and a pitch of 21.0 mm, for example, to match HDTV specifications.

Film with the above four frame formats is stored in the same film cartridge as presently available 35-mm film.

Because the frames in either of the above frame formats have a width of 30 mm, there are unexposed areas of about 2.5 mm between the frames and along the opposite longitudinal edges of the film. These unexposed areas may be used to keep the film flat, control the film, and write and read data when taking pictures.

The proposed camera may be relatively small and lightweight, because it does not require film-transport sprocket wheels.

Films that are actually collected in processing laboratories are processed either simultaneously in a batch or individually. In a simultaneous batch process, several thousand films are processed per hour at a high rate to realize economics of scale for reducing the printing cost. Specifically, a plurality of exposed films are collected in the processing laboratory and are spliced end to end to form a long, continuous film strip, which is then stored in a film magazine and subsequently processed.

If the films that are spliced into the continuous strip contain frames exposed in different frame formats, such as disclosed in U.S. Pat. No. 5,049,908, then the long single film stored in the film magazine contains different frame sizes, thereby making printing a problem.

U.S. Pat. Nos. 4,384,774 and 5,066,971 propose cameras capable of switching between half and full frame sizes at the time the film is exposed. When film exposed using these proposed cameras is spliced into a long, single, film strip for simultaneous batch processing, the continuous film strip also contains different frame sizes.

The processing laboratories are therefore required to form notches indicative of frame centers for automatically printing spliced films with different frame sizes after they are developed. For example, as disclosed in U.S. Pat. No. 4,557,591, a human operator manually notches a side edge of a spliced film and, hence, the notches are required to control the feed of the film. With the disclosed process, it is impossible to process several thousand films per hour, however, the cost of processing exposed film is relatively high. As a consequence, films with different frame sizes may not be accepted by processing laboratories in Japan.

Many processing laboratories all over the world also do not accept films with frames exposed in half size because they do not want different frame sizes to be contained in a single spliced film that is stored in a single film magazine for subsequent processing and printing. This problem arises because the different frame sizes can be recognized only after the film has been developed. One solution would be to apply marking seals to exposed films so that the films of different frame sizes thereof can be distinguished and sorted out for individual processing and printing. Nevertheless, use of marking seals would not essentially solve the problem, because it would be difficult to supply such marking seals consistently over a number of years.

OBJECTS AND SUMMARY OF THE INVENTION

Accordingly, it is an object of the present invention to provide a variable frame size photographic system that can eliminate the above-noted drawbacks inherent in prior proposed systems.

It is another object of the present invention to provide a photographic camera that can expose a photographic film in different frame sizes as desired.

Another object of the present invention is to provide a photographic film printer for automatically printing successive photographic films, even if they contain different frame sizes.

According to one aspect of the present invention, there is provided a photographic camera system including a photographic camera having a camera body, a first housing disposed in the camera body for housing a photographic film cartridge, a second housing disposed in the camera body for housing a photographic film drawn from the photographic film cartridge, a film feed device disposed in the camera body for feeding the photographic film between the first and second housings, an exposure device disposed in the camera body for exposing an exposure area of the photographic film fed by the film feed device to an image of a subject between the first and second housings, and a recording device disposed in the camera body for recording an exposure position control signal indicative of a position where the photographic film is to be exposed by the exposure device on the photographic film. The photographic camera system also includes a photographic film printer having a printer body, a detecting device disposed on the printer body for detecting the exposure position control signal recorded on the photographic film, a film feed control device disposed on the printer body for controlling feeding of the photographic film based on the exposure position control signal detected by the detecting device, and a printing device disposed on the printer body for varying an opening width of a mask that is used to print the image of the subject in the exposure area of the photographic film on a print paper, depending on the exposure position control signal.

According to another aspect of the present invention, there is also provided a photographic camera including a first housing for housing a photographic film cartridge, a second housing for housing a photographic film drawn from the photographic film cartridge, a film feed device for feeding the photographic film between the first and second housings, an exposure device for exposing an exposure area of the photographic film fed by the film feed device to an image of a subject, and a recording device for recording an exposure position control signal indicative of a position where the photographic film is to be exposed by the exposure device on the photographic film.

In another aspect the present invention provides a photographic camera including a camera body, a first housing disposed in the camera body for housing a photographic film cartridge, a second housing disposed in the camera body for housing a photographic film drawn from the photographic film cartridge, a film feed device disposed in the camera body for feeding the photographic film between the first and second housings, an exposure device disposed in the camera body for varying a width in which the photographic film is exposed to an image of a subject in a direction in which the photographic film is fed by the film feed device, between the first and second housings, and a control unit disposed in the camera body for controlling the film feed device to feed the photographic film for a length corresponding to an increase in the width, at least when the width of the frame is increased.

The present invention in another aspect also provides a photographic film printer including a printer body, a detecting device disposed on the printer body for detecting an exposure position control signal recorded on a photographic film, a film feed control unit disposed on the printer body for controlling feeding of the photographic film based on the exposure position control signal detected by the detecting device, and a printing device disposed on the printer body for varying an opening width of the mask that is used to print an image of a subject in an exposure area of the photographic film on a print paper, depending on the exposure position control signal.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 12A and 12B are fragmentary front elevational views showing the relationship between a 35-mm film and sensors in the automatic printer shown in FIG. 10;

FIGS. 14A and 14B are representative of the relative sizes of negative-carrier variable slits in the automatic printer;

FIGS. 15A and 15B are representation showing the relative sizes of variable paper masks in the automatic printer;

DETAILED DESCRIPTION OF PREFERRED EMBODIMENTS

Figure 1:
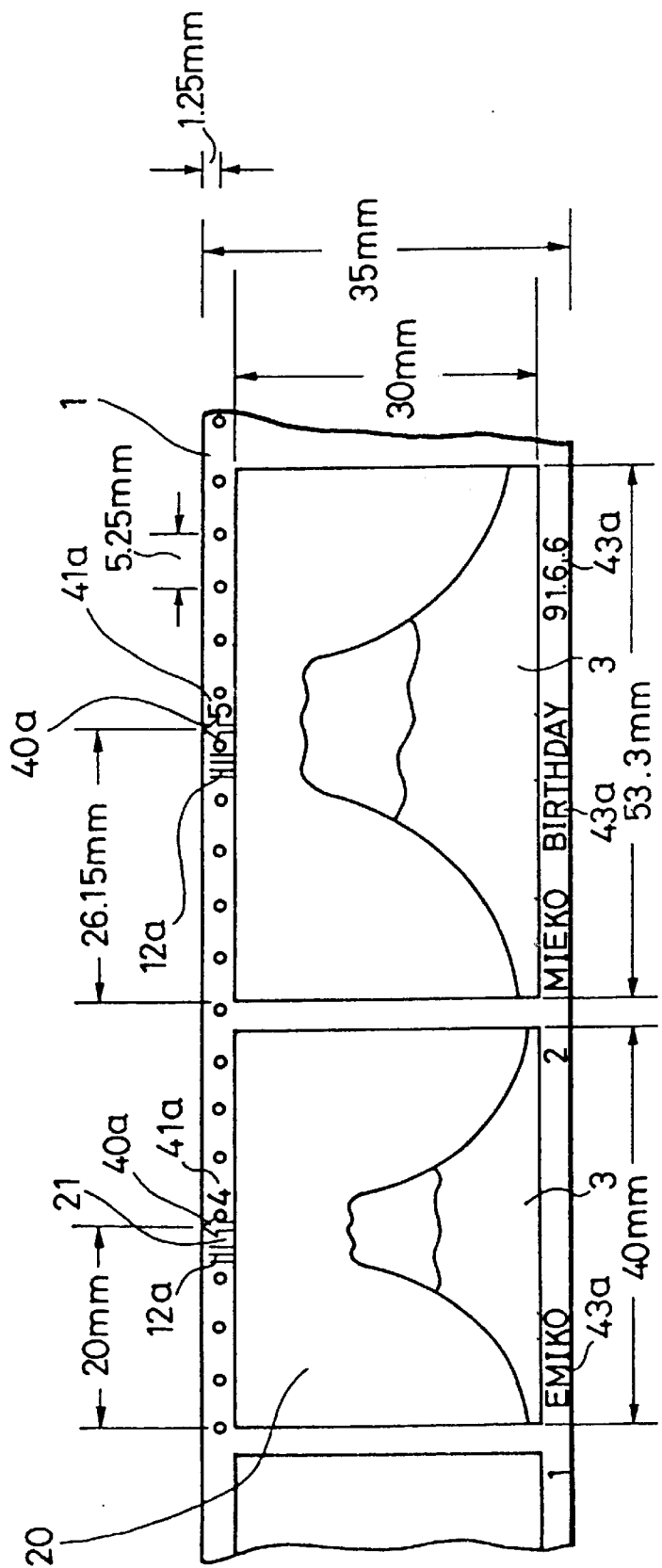
FIG. 1 is a fragmentary front elevational view of a 35-mm film that has been exposed using a 35-mm photographic camera according to an embodiment of the present invention.
Figure 2:
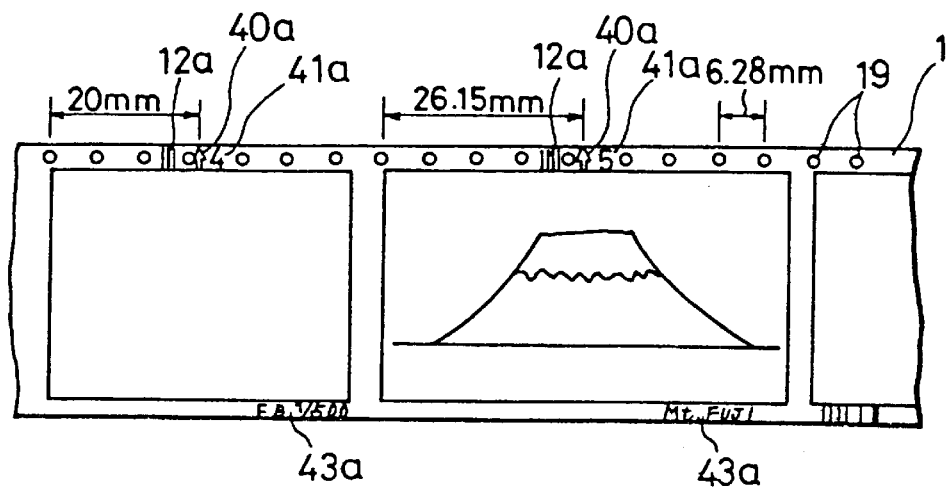
FIG. 2 is a fragmentary front elevational view of another 35-mm film that has been exposed using an embodiment of the 35-mm photographic camera of the present invention.
Figure 3A:
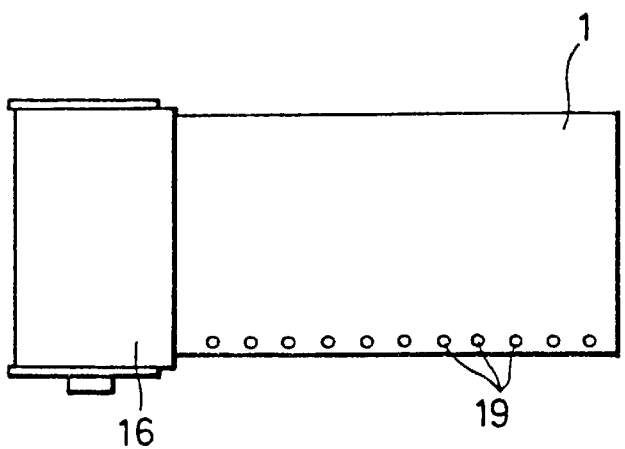
FIGS. 3A and 3B are elevational views of 35-mm film cartridges that can be used in the 35-mm photographic camera embodiment of the present invention.
Figure 3B:
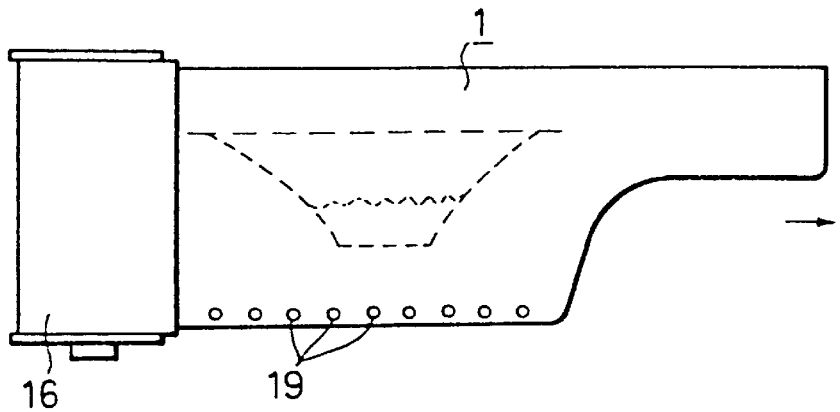

A 35-mm photographic film 1 that can be used in a 35-mm photographic camera according to the present invention is described with reference to FIGS. 1, 2, 3A, and 3B, in which FIGS. 1 and 2 show 35-mm photographic film 1 after it has been exposed, and FIGS. 3A and 3B show 35-mm photographic film 1 before it is exposed.

As shown in FIGS. 3A and 3B, the 35-mm photographic film 1 is stored in a film cartridge 16 and has an end extending out of the film cartridge 16. Images that are photographed on the 35-mm photographic film 1 are turned upside down by the lenses, so that the upper end of an image is positioned on a lower portion of the photographic film 1. FIG. 3B shows by way of example a photographed image of a subject in broken lines, which appears to be turned upside down on the photographic film 1.

Each of the photographic films 1 shown in FIGS. 1, 2, 3A, and 3B has a series of film position detecting holes 19 defined along an unexposed marginal edge area thereof, which has a width of about 2.5 mm. The film position detecting holes 19 have a diameter of about 1 mm and are spaced at a constant, predetermined pitch. The pitch of the film position detecting holes 19 in the photographic film 1 shown in FIG. 1 is 5.25 mm, for example, and the pitch of the film position detecting holes 19 in the photographic film 1 shown in FIG. 2 is 6.28 mm.

Distances by which the different photographic films 1 with the film position detecting holes 19 spaced at the pitches of 5.25 mm and 6.28 mm are advanced to feed frames of different frame sizes are given in Table 1 below.

TABLE 1

| Frame sizes (Width × length) | Pitch = 6.28 mm | Pitch = 5.25 mm |
| --- | --- | --- |
| NTSC-matched frame size (30 mm × 40 mm), full size | 43.96 = 6.28 × 7 pitches | 42.0 = 5.25 × 8 pitches |
| HDTV-matched frame size (30 mm × 53.3 mm), full size | 56.52 = 6.28 × 9 pitches | 57.75 = 5.25 × 11 pitches |
| HDTV-matched frame size (30 mm × 16.9 mm), half size | 18.84 = 6.28 × 3 pitches | 21.0 = 5.25 × 4 pitches |
| NTSC-matched frame size (30 mm × 22.5 mm), half size | 25.12 = 6.28 × 4 pitches | 26.25 = 5.25 × 5 pitches |

The photographic film 1 shown in FIG. 3A has film position detecting holes 19 that will be positioned along an upper marginal edge area after the photographic film is exposed, however, no tongue is provided at the leading end, so that no tongue-removing process will subsequently be required. Because no tongue-removing process will be required, the subsequent processing of the photographic film 1 is less costly.

The photographic film 1 shown in FIG. 3B also has film position detecting holes 19 that will be positioned in an upper marginal edge area thereof after the photographic film is exposed, and has a tongue at its leading end on its lower portion. The tongue at the leading end of the photographic film 1 is vertically opposite in position to the tongue of an ordinary 35-mm photographic film that is now generally commercially available. If a photocoupler is used in a photographic camera for detecting the film position detecting holes 19, then when the photographic film 1 is loaded into the photographic camera, the marginal edge with the film position detecting holes 19 is not required to be manually inserted into the photocoupler, but is automatically inserted into the photocoupler when the photographic film 1 is wound by a film transport mechanism in the photographic camera.

Figure 4:
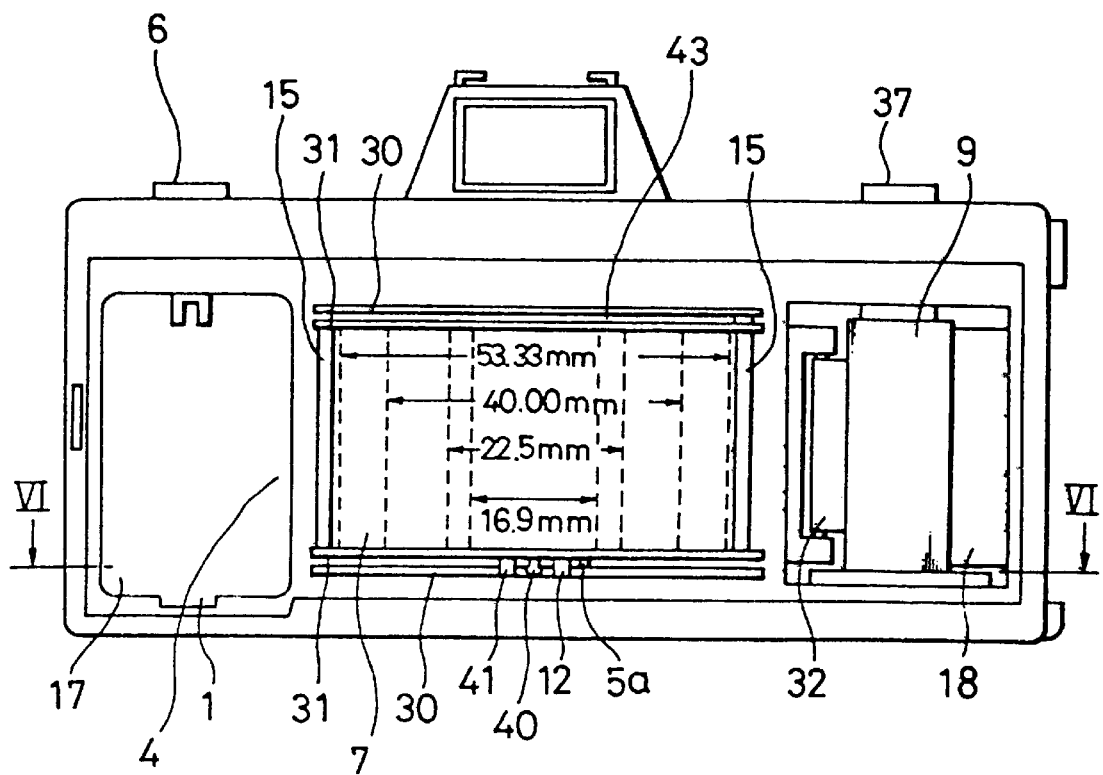
FIG. 4 is a rear elevational view of the 35-mm photographic camera of the embodiment of the present invention with a rear lid removed.
Figure 5:
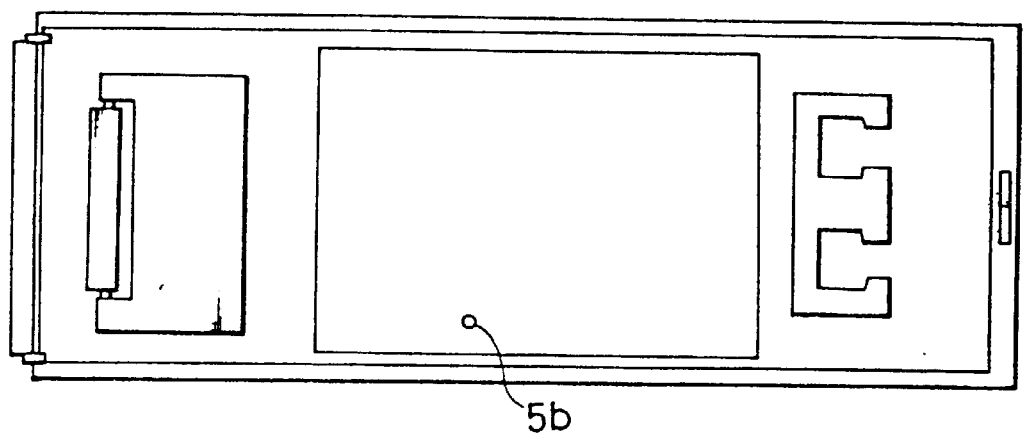
FIG. 5 is an elevational view of an inner surface of a rear lid of the 35-mm photographic camera of FIG. 4.

An embodiment of a photographic camera that can use the photographic films 1 shown in FIGS. 1, 2, 3A, and 3B is shown and described with reference to FIGS. 4 through 8. FIG. 4 is a rear elevation of the photographic camera with the rear lid or removed. The lid is shown in FIG. 5. The photographic camera has a dark box 4 including a cartridge housing 17 for housing the film cartridge 16, which is of a known structure, an exposure opening 7 near the cartridge housing 17 and through which the photographic film 1 can be exposed to light passing through a camera lens, aperture, and shutter not shown in FIG. 4, and a film housing 18 for housing the photographic film 1 after it has been exposed.

The photographic film 1 that is unwound from the film cartridge 16 housed in the cartridge housing 17 is fed over the exposure opening 7 while being transversely limited in motion by upper and lower respective pairs of film guides 30, 31, and is then moved into the film housing 18 after being exposed.

Figure 7:
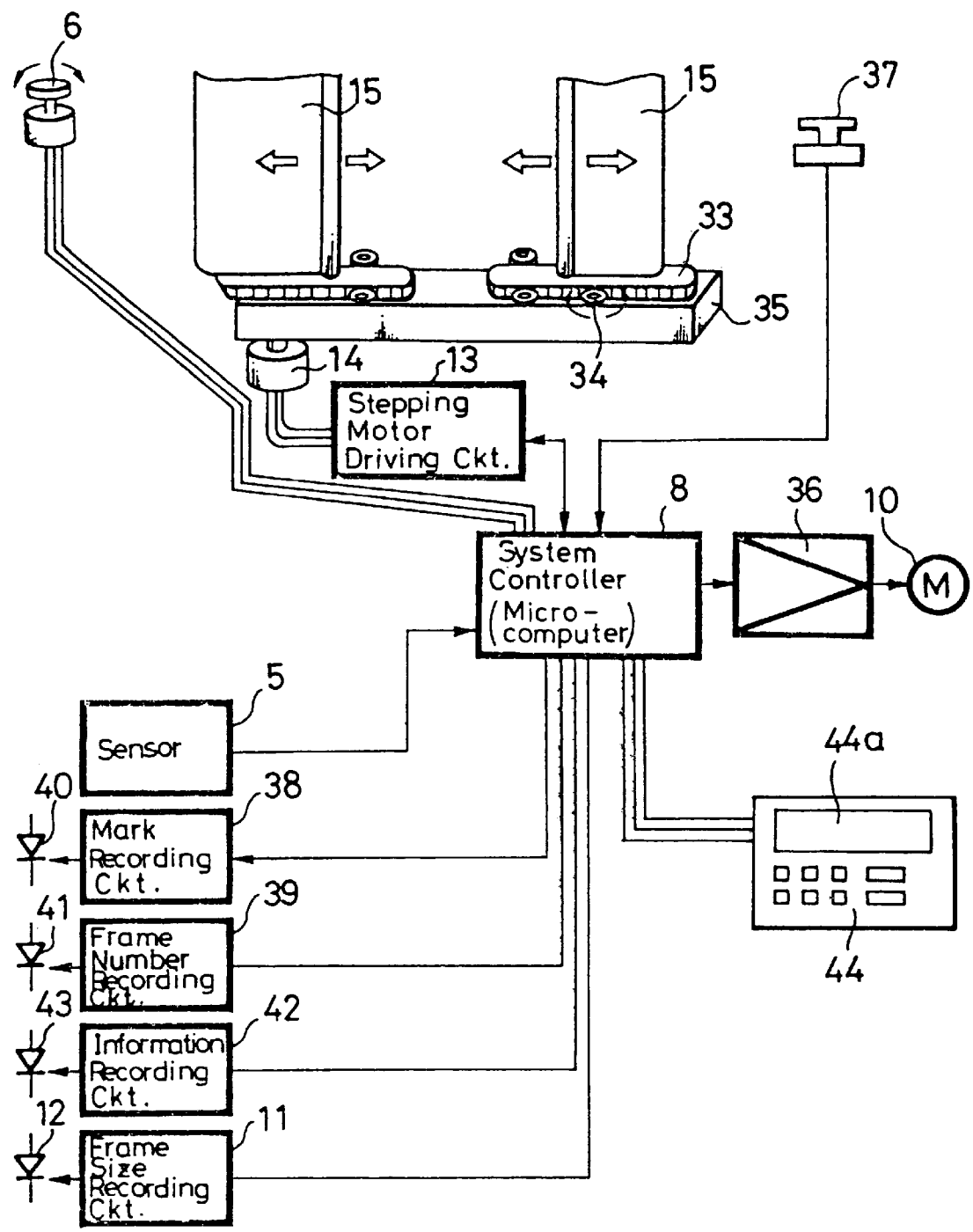
FIG. 7 is a block diagram of a control system used in the embodiment of the 35-mm photographic camera according to the present invention.

The film housing 18 has a guide roller 32 for automatically setting or loading the photographic film 1, and a film takeup spool 9 rotatable by a motor, shown at 10 in FIG. 7, for winding the exposed photographic film 1 thereon.

The photographic camera has a light-emitting diode (LED) 5a positioned between the lower film guides 30, 31 for detecting the film position detecting holes 19, and a photodetector, shown in FIG. 5 at 5b, disposed on a pressure plate of the rear lid and positioned in registry with the LED 5a across the photographic film 1. The photodetector 5b has a diameter of 1.5 mm, for example.

The LED 5a emits infrared radiation having a wavelength of 940 nm, which is different from those radiation wavelengths to which the photographic film 1 is sensitive. Referring to FIG. 7, the LED 5a and the photodetector 5b jointly make up a hole sensor 5 that applies an output signal to a counter in a system controller 8 that comprises a microcomputer. In this way, the system controller 8 can recognize the position of the photographic film 1 over the exposure opening 7. The LED 5a and the photodetector 5b may be alternatively replaced with a photocoupler that also comprises an LED and a photodetector but which are positioned in confronting relationship, as described hereinbelow.

In FIG. 4, the exposure area opening 7 has its size defined by left and right movable masks 15 that are laterally movable over the width of the exposure opening 7 from opposite sides thereof. The size of the exposure opening 7 in the longitudinal direction of the photographic film 1 can selectively be changed to four different dimensions of 53.33 mm, 40.00 mm, 22.5 mm, and 16.90 mm as indicated by the four pairs of broken lines in FIG. 4.

Figure 6:
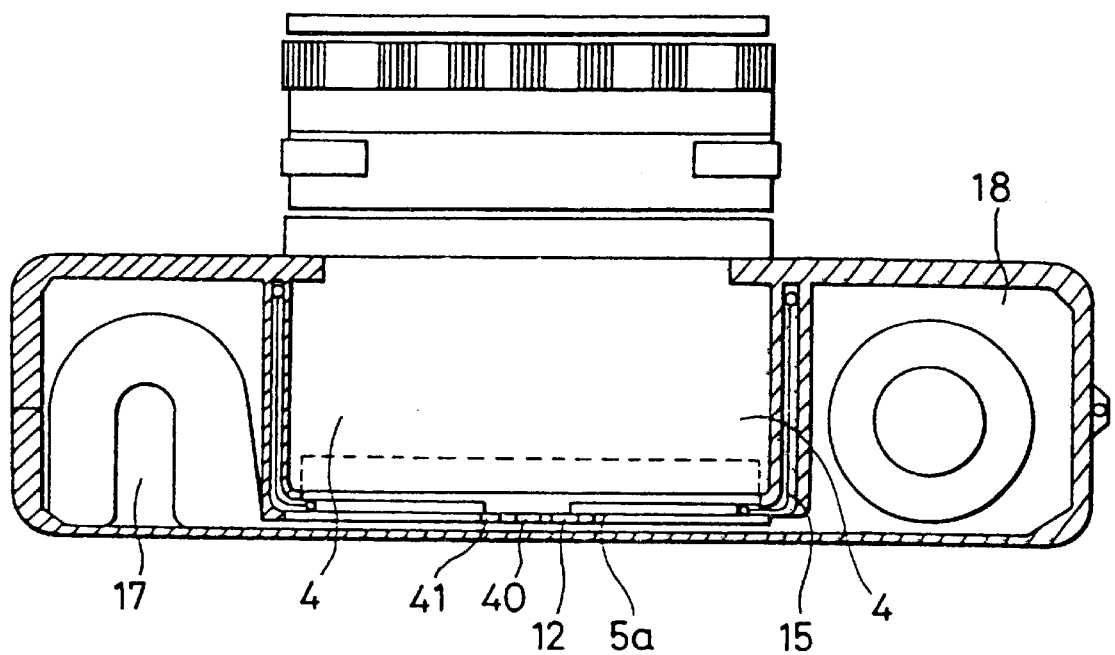
FIG. 6 is a cross-sectional view taken along line VI—VI of FIG. 4.
Figure 8:
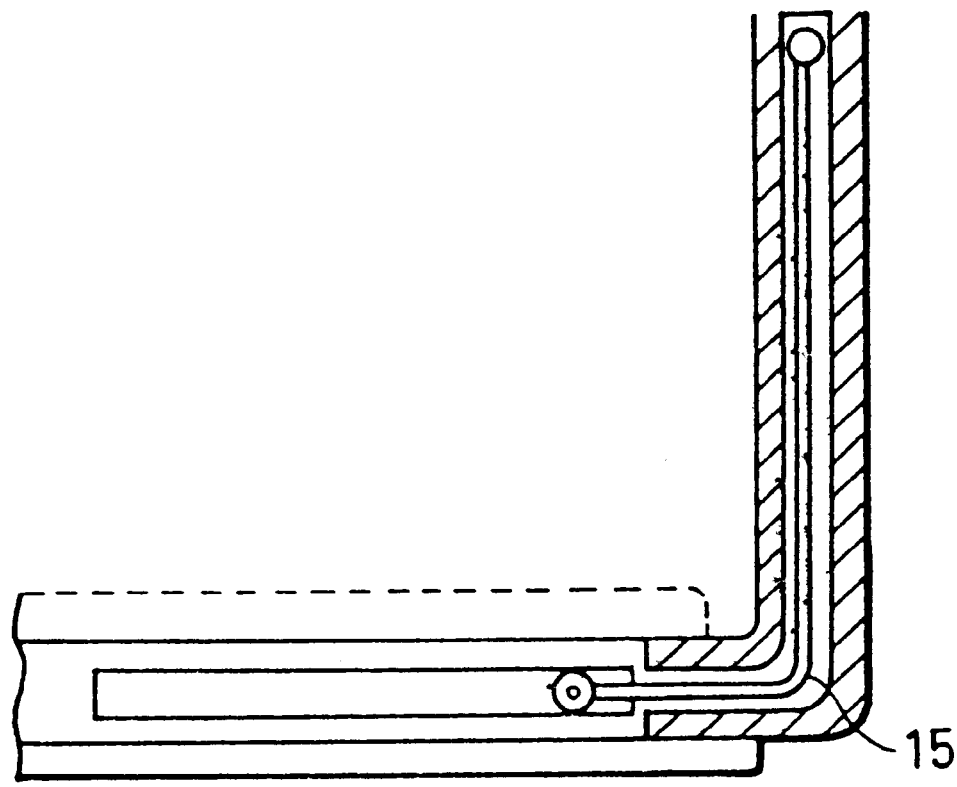
FIG. 8 is an enlarged fragmentary view of a portion of the camera shown in FIG. 6.

As shown in FIGS. 6 and 8, the left and right movable masks 15 are retractable into left and right side walls, respectively, that are positioned on opposite sides of the exposure opening 7 and extend substantially perpendicularly to the photographic film 1 as it extends over the exposure opening 7. As shown in FIG. 7, two linear toothed bars 33 are attached to the respective lower edges of the movable masks 15 and held in mesh with respective drive feed gears 34 of a gearbox 35, much like a rack and pinion assembly. When the gears 34 of the gearbox 35 are driven to rotate the linear toothed bars 33, and hence the movable masks 15, are linearly moved over the exposure opening 7.

As shown in FIGS. 4 and 6, the photographic camera has a frame size setting switch 6 which can manually be turned by the user of the camera to produce a command signal indicative of a selected frame size which is one of the frame sizes described above in Table 1. When the user selects a frame size with the frame size setting switch 6, the frame size setting switch 6 applies a command signal to the system controller 8, which then supplies a control signal to achieve the desired frame size through a stepping motor driving circuit 13 to a stepping motor 14. The stepping motor 14 is energized to rotate the feed gears 34 to move the movable masks 15. At the same time that the movable masks 15 move, the hole sensor 5 produces and supplies a detected film position signal to the system controller 8, which processes the supplied film position signal to generate a control signal. The system controller 8 then supplies the control signal through an amplifier 36 to a motor 10, which rotates the film spool 9 to take-up the photographic film 1 over a predetermined length.

At this time, the length over which the photo graphic film 1 is driven corresponds to the distance that is determined by the frame size setting switch 6. The feeding of the photographic film 1 is described below with reference to FIGS. 9A through 9E, which show examples in which the hole pitch is 6.28 mm and the photographic film 1 is to be exposed in an HDTV-matched full-frame size of 30 mm×53.3 mm and an NTSC-matched full-frame size of 30 mm×40 mm.

Figure 9A:
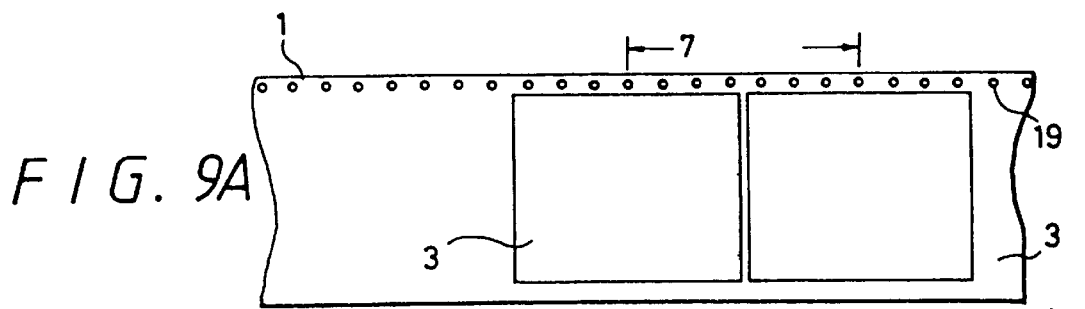
FIGS. 9A through 9E are fragmentary front elevational views showing the positional relationships of frames exposed on a 35-mm film using the embodiment of the 35-mm photographic camera according to the present invention.
Figure 9B:
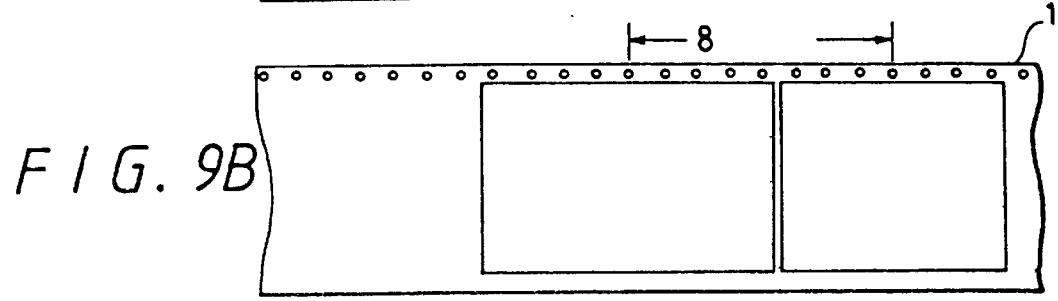
Figure 9C:
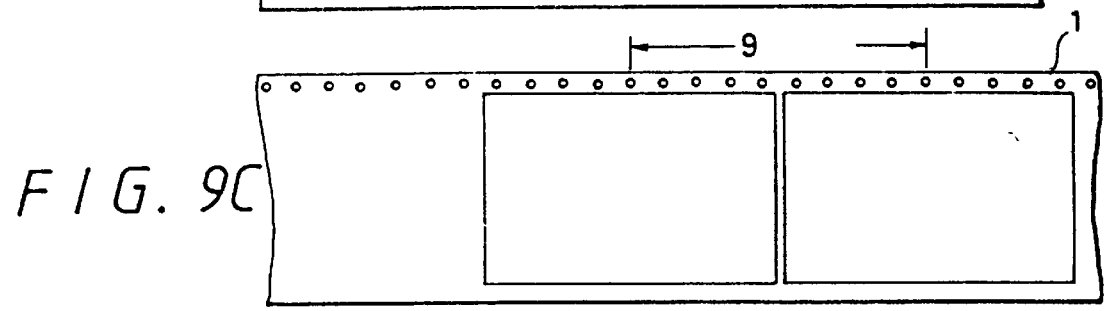
Figure 9D:
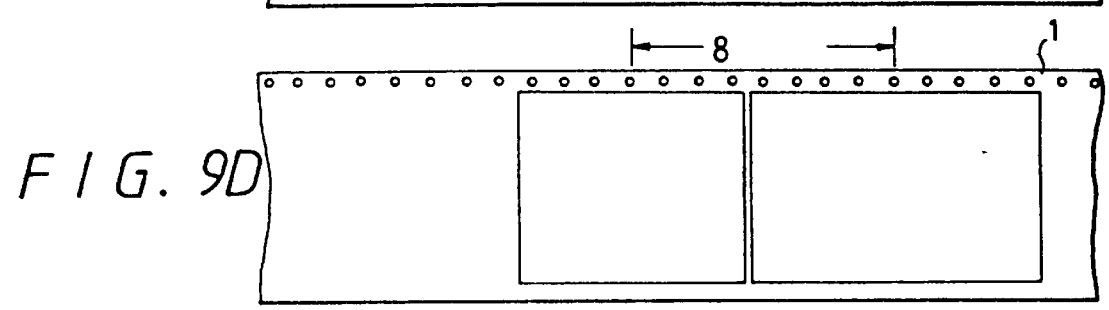

FIG. 9A shows a portion of the photographic film 1 as it is exposed in successive NTSC-matched full frames. When the photographic film 1 is fed for seven pitches of the holes 19, a frame area of 30 mm×40 mm is made available for exposure through the exposure opening 7. To switch from an NTSC-matched full-frame size to an HDTV-matched full-frame size, the photographic film 1 is fed for eight pitches of the holes 19, as shown in FIG. 9B, to make a frame area of 30 mm×53.3 mm available for exposure through the exposure opening 7. To expose the photographic film 1 in successive HDTV-matched full frames, the photographic film 1 is fed for nine pitches of the holes 19, as shown in FIG. 9C, to make a frame area of 30 mm×53.3 mm available for exposure through the exposure opening 7. To switch from an HDTV-matched full-frame size to an NTSC-matched full-frame size, the photographic film 1 is fed for eight pitches of the holes 19, as shown in FIG. 9D, to make a frame area of 30 mm×40 mm available for exposure through the exposure opening 7.

To change frame sizes, the system controller 8 controls the motor 10 as follows: When switching from an NTSC-matched full-frame size to an HDTV-matched full-frame size, the photographic film 1 is first driven for seven pitches of the holes 19 and is then driven for one additional hole pitch. When switching from an HDTV-matched full-frame size to an NTSC-matched full-frame size, the photographic film 1 is first driven forward for nine pitches of the holes 19 and is then driven backward for one pitch.

Figure 9E:
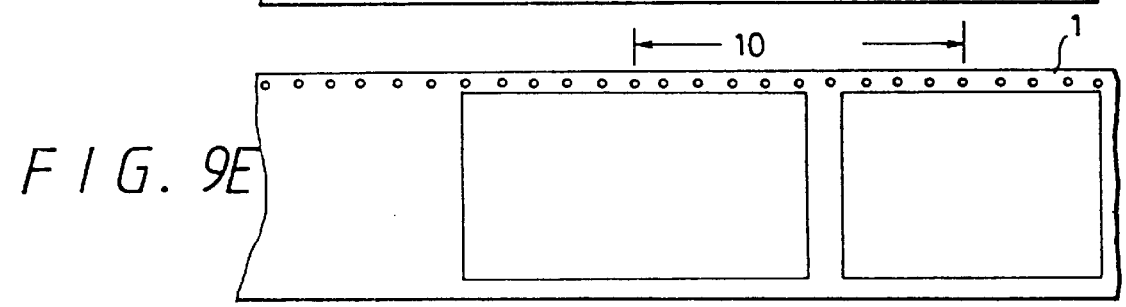

When changing frame sizes, the photographic film 1 may be driven for a different distance or a different number of pitches, such as ten pitches of the holes 19, as shown in FIG. 9E. In this manner, the photographic film 1 may be easily exposed in many different frame sizes.

As shown in FIGS. 9A through 9E, the system controller of the photographic camera controls the feeding of the photographic film 1 such that the photographic film 1 will not be exposed in overlapping frames, even when different frame sizes are exposed.

FIGS. 1 and 2 illustrate the photographic film 1 whose effective exposure areas have been exposed in frames 3 of different sizes. In FIG. 1, the photographic film 1 has been exposed in an HDTV-matched full-frame size, having a width of 30 mm, a length of 53.3 mm, and aspect ratio of 9:16, and in an NTSC-matched full-frame size, having a width of 30 mm, a length of 40 mm) whose aspect ratio is 3:4. The holes 19 defined along the upper marginal edge of the photographic film 1 have a pitch of 5.25 mm.

In FIG. 2, the photographic film 1 has also been exposed in an HDTV-matched full-frame size and an NTSC-matched full-frame size, however, unlike FIG. 1, the holes 19 defined in the upper marginal edge of the photographic film 1 have a pitch of 6.28 mm. In FIG. 2, one frame of an HDTV-matched full-frame size corresponds nine pitches of the holes 19, and one frame of an NTSC-matched full-frame size corresponds seven pitches of the holes 19. Since these pitches are odd-numbered, a hole 19 may be positioned in alignment with the center of the frame, so that the center of the frame can easily be detected.

As shown in FIGS. 4 and 7, the photographic camera has a shutter release button 37. When the shutter release button 37 is depressed, the system controller 8 controls the size of the exposure area and supplies a control signal to a mark recording circuit 38 for recording a central mark, a so-called effective exposure area position signal, indicative of the center of the frame 3 and also supplies a control signal to a frame number recording circuit 39 for recording a frame number. The mark recording circuit 38 energizes an LED 40 positioned at the lower film-guide pair 30, 31 for recording a central mark 40a, shown in FIGS. 1 and 2, representing the center of the exposed frame 3. The frame number recording circuit 39 energizes an LED 41 positioned at the lower film guide pair 30, 31 for recording a frame number 41a, shown in FIGS. 1 and 2, representing the frame number of the exposed frame 3. The frame number 41a can be recorded such that it agrees with an actual frame number.

The system controller 8 also supplies a control signal to a frame size recording circuit 11 for recording a frame size signal, a so-called effective exposure area width signal, indicative of the frame size of the exposed frame 3. The frame size recording circuit 11 energizes an LED 12 positioned at the lower film guide pair 30, 31 for recording a frame size signal 12a, shown in FIGS. 1 and 2.

The LED 12 may be composed of four LED elements which are selectively energized to record one of frame size signals 12a, which represent the frame size set by the frame size setting switch 6. The various frame size signals 12a are shown by way of example in Table 2 below.

TABLE 2

| Frame Size | Frame size signal 12a |
|---|---|
| HDTV-matched full-frame size | ‖‖‖‖ |
| NTSC-matched full-frame size | ‖‖‖ |
| NTSC-matched half-frame size | ‖‖ |
| HDTV-matched half-frame size | ‖ |

The central mark 40a and the frame size signal 12a supply information regarding the frame position and the frame size to an automatic printer, described hereinbelow, for controlling the automatic printer when the exposed and processed film is printed.

While frame sizes can be recognized by measuring the distances between adjacent central marks 40a when the exposed film is printed, the processing speed of the automatic printer can be increased by using the frame size signal 12a.

At the same time that the photographic film 1 is exposed, the system controller 8 supplies an information signal to an information recording circuit 42 for recording desired information. The information recording circuit 42 energizes an LED 43 positioned at the upper film guide pair 30, 31 for recording such information 43a on the lower marginal edge, shown in see FIGS. 1 and 2, of the photographic film 1. The information 43a may be information that is supplied from the camera lens and the camera itself upon exposure or could consist of the exposure date, the person who took the picture, an exposure condition, or other information that the user has entered through an input device 44, such as a keypad, on the outer surface of the rear lid of the camera body 10. The amount of information 43a, that is, the number of characters that can be recorded, is dependent upon the frame size, and is displayed on a display panel 44a of the input device 44. The LED 43 has a number of LED elements that are selectively energized depending-on the frame size.

An analysis has been made to determine the optimum position where the information 43a should be recorded and the optimum position where the holes 19 are defined from the standpoints of the user's convenience and a psychological effect that those positions have on the user. The results of the analysis are as follows:

(1) If marginal edges outside of the effective exposure area of the film are available as a band for recording user's information, then the information should more preferably be positioned on the lower marginal edge of the print paper, rather than on the upper marginal edge.

(2) Study of the developing and printing processes in processing laboratories indicates that in many cases information about the film itself is printed-in many cases on film negatives, such that the film information will be positioned on the upper marginal edge of the print paper. It is preferable not to mix the film information and the band for recording user's information.

From the above results, it is preferable to position the film position detecting holes 19 upwardly of the effective exposure area of the film when it is exposed.

As described above with reference to FIGS. 4 through 7, the photographic camera according to the present invention has a detecting means 5a, 5b for detecting the feeding of the photographic film 1, a film control system 8, 9, 10 for controlling the distance by which the photographic film 1 moves and for driving the photographic film 1 for a length corresponding to the width of the selected exposure opening 7, based on a detected signal from the detecting means 5a, 5b, and for controlling a signal recording device 8, 11, 12, 38, 40 disposed near the exposure opening 7 for recording a signal indicative of the position of the exposure opening 7 on the photographic film 1 when the photographic film 1 is exposed through the exposure opening 7.

After the photographic film 1 is exposed using the photographic camera, the processed photographic film 1 bears control signals that are recorded in a signal recording area 21, shown in see FIG. 1, thereof and that will be used when the photographic film 1 is printed. Therefore, even if the developed photographic film 1 contains frames of different frame sizes, it can be automatically printed by an automatic printer without requiring individual adjustment.

The photographic camera according to the present invention also has a film control system 8, 9, 10 for controlling the feeding or driving of the photographic film 1, and an opening control system 8, 13, 14, 15 for varying the width of the exposure opening 7 along the photographic film 1. At least when the width of the exposure opening 7 changes from a smaller dimension to a larger dimension, the film control system 8, 9, 10 drives the photographic film 1 for a length corresponding to the selected width of the exposure opening 7.

Therefore, the width of the exposure opening 7 is variable, and the take-up or driving of the photographic film 1 is controlled depending on the width of the exposure opening 7. The photographic camera can expose the photographic film 1 successively in desired frame sizes which may differ one from another without adjacent frames overlapping each other.

As shown in FIG. 1, the photographic film 1 used in the photographic camera according to the present invention has a signal recording area 21 located between an effective exposure area 20 and a marginal edge thereof for recording control signals, which will be used when the photographic film 1 is processed and printed. The film 1 also has holes 19 defined in an upper marginal edge area thereof between the effective exposure area 20 and the marginal edge for detecting the distance by which the photographic film 1 has been moved.

Figure 10:
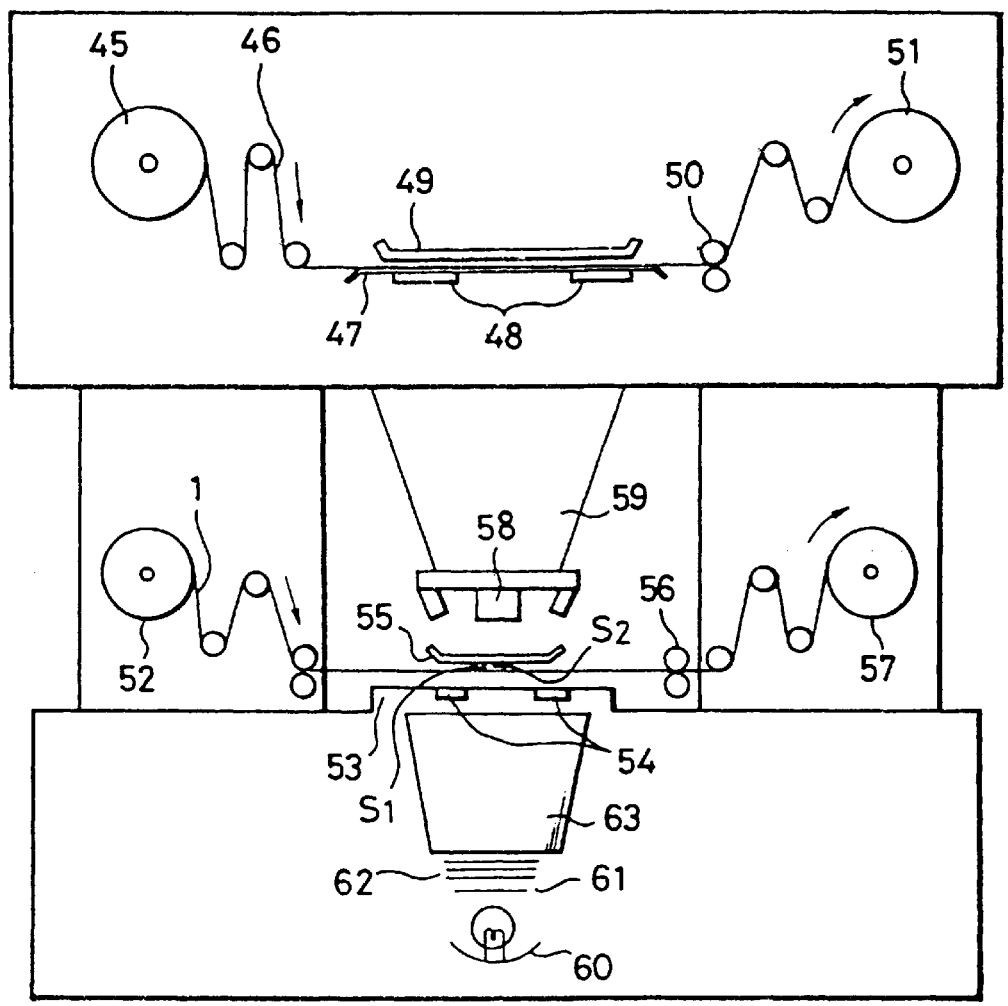
FIG. 10 is an elevational view of an automatic printer for printing on photosensitive paper a 35-mm film exposed using the embodiment of the 35-mm photographic camera according to the present invention.

As shown in FIG. 10, an automatic printer for automatically printing processed photographic film 1 that has been exposed using a camera as described above has a printer body that supports a paper supply reel 45 for supplying the sensitized print paper 46, a paper deck or platen 47 for supporting the print paper 46 supplied from the paper supply reel 45, a variable paper mask 48 for determining the size of a print paper segment on which an image is to be printed, a paper holder plate 49 for holding the print paper 46 down against the paper deck 47, a paper feed or drive roller 50 for driving the print paper 46, and a paper takeup reel 51 for winding the exposed print paper 46.

The printer body of the automatic printer also supports a film supply reel 52 for supplying the processed photographic film 1, a film deck or platen 53 for supporting the photographic film 1 supplied from the film supply reel 52, a negative-carrier variable slit 54, a negative holder plate 55 for positioning the negative down against the film deck 53, a film feed or drive roller 56 for driving the photographic film 1, a film takeup reel 57 for winding the exposed and processed photographic film 1, a lens 58 positioned above the negative holder plate 55, a bellows 59 supporting the lens 58 and positioned below the paper deck 47, a lamp 60 disposed below the film deck 53, a black shutter 61 positioned above the lamp 60, a filter assembly 62 composed of yellow, magenta, and cyan (Y, M, C) filters, and a diffusion box 63 disposed between the filter assembly 62 and the film deck 53.

The negative holder plate 55 supports a frame size sensor S1 for detecting the frame size signal 12a recorded on the photographic film 1 and a frame center sensor S2 for detecting the central mark 40a recorded on the photographic film 1 that indicates the center of a frame.

Upon detection of the central mark 40a of the frame 3 with the frame center sensor S2, the film drive roller 56 is controlled to drive the film to align the frame center with the center of the negative-carrier variable slit 54. The variable paper mask 48 and the negative-carrier variable slit 54 are controlled based on the frame size signal 12a that is detected by the frame size sensor S1.

If the frame size is an HDTV-matched frame size, for example, the negative-carrier variable slit 54 is set to dimensions as shown in FIG. 14A, and the variable paper mask 48 is set to dimensions as shown in FIG. 15A. If the frame size is an NTSC-matched frame size, for example, the negative-carrier variable slit 54 is set to dimensions as shown in FIG. 14B, and the variable paper mask 48 is set to dimensions as shown in FIG. 15B.

Figure 11:
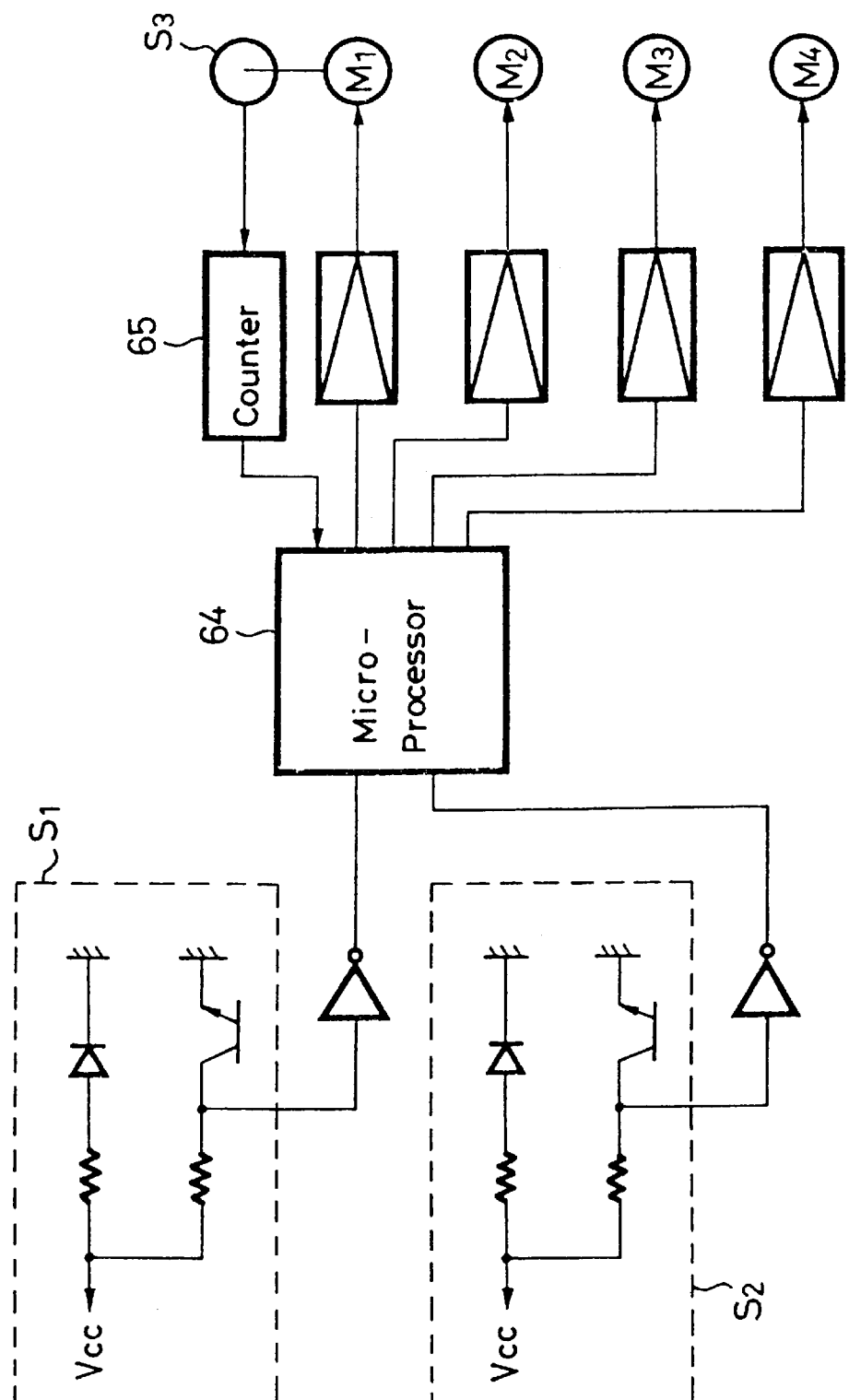
FIG. 11 is a block diagram of a control system used in the embodiment of the automatic printer shown in FIG. 10.

A control system for the automatic printer is shown in FIG. 11, in which the frame size sensor S1 and the frame center sensor S2 comprise photocouplers, respectively, for detecting the frame size signal 12a and the central mark 40a, respectively, that are recorded in the marginal edge area of the photographic film 1.

The frame center is determined based on the central mark 40a detected by the frame center sensor S2, and the frame size of the frame 3 whose frame center is determined by a microprocessor 64 of the control system based on the frame size signal 12a that is read by the frame size sensor S1 before the central mark 40a is detected by the frame center sensor S2. Then, the microprocessor 64 controls a mask size drive motor M3 to actuate the variable paper mask 48 to conform with the determined frame size. At the same time, the microprocessor 64 controls a negative-carrier variable slit drive motor M2 to actuate the negative-carrier variable slit 54.

Based on the frame size signal 12A read by the frame size sensor S1, the microprocessor 64 controls a film feed motor M1 to rotate the film feel roller 56 for feeding the photographic film 1 for a predetermined length. At the same time, the microprocessor 64 controls a paper feed motor M4 to rotate the paper feed roller 50 for thereby feeding the print paper 46 for a predetermined length.

FIGS. 12A and 12B show the relationship between the photographic film 1, the frame center sensor S2, and the frame size sensor S1 in the automatic printer. When the photographic film 1 is driven in the direction indicated by the arrow A in FIG. 12A, a frame size signal 12a is detected by the frame size sensor S1 before its frame 3 is positioned for controlling of the driving of the photographic film 1, the negative-carrier variable slit 54, and the variable paper mask 48. The frame size signal 12a is processed by the microprocessor 64, which determines the frame size when the frame center of the frame 3 is determined.

As shown in FIGS. 12A and 12B, the central mark 40A indicative of a frame center is recorded at each frame on the photographic film 1. At each frame, the frame size signal 12a is recorded ahead of the central mark 40a, and the frame number 41a is recorded behind the central mark 40a with respect to the direction in which the photographic film 1 is driven.

While the frame center sensor S2 and the frame size sensor S1 are shown as being located in substantially the same position, only the frame center sensor S2 should be positioned in alignment with the center of the negative-carrier variable slit 54 and the variable paper mask 48, and the frame size sensor S1 may be positioned on the film deck 53 at the entrance end thereof.

Figure 13:
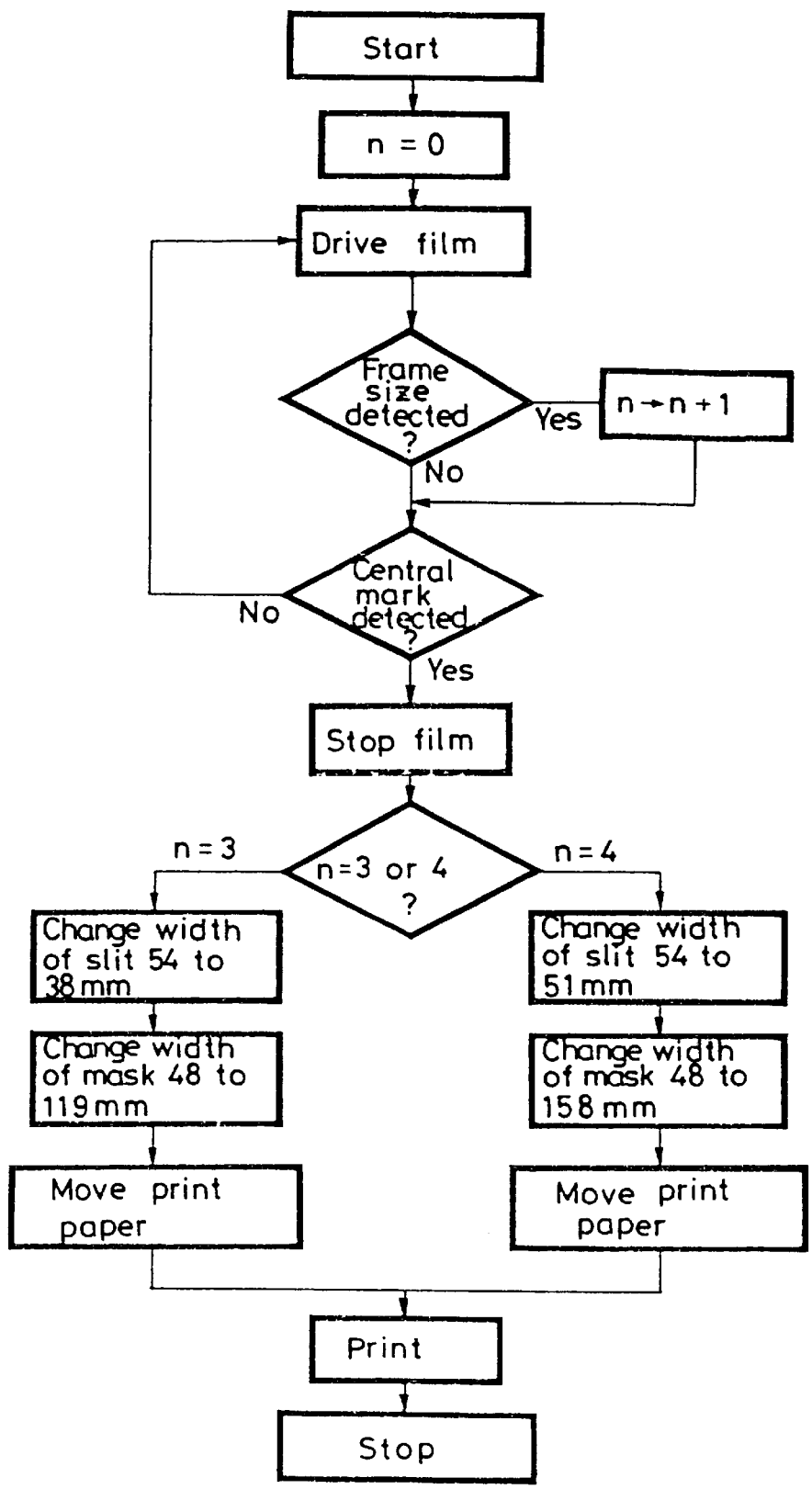
FIG. 13 is a flowchart of an operating method that is performed by a microprocessor of the control system shown in FIG. 11.

FIG. 13 shows a control sequence of the micro-processor 64 for controlling the driving of the developed photographic film or negative 1 and the driving of the print paper 46. The negative-carrier variable slit 54 and the variable paper mask 48 are also controlled in this control sequence. The photographic film 1 is continuously driven and taken up until the central mark 40a is detected by the frame center sensor S2, an then the photographic film 1 is stopped when the central mark 40a is detected by the frame center sensor S2. Until the photographic film 1 is stopped, the frame size signal 12a is detected by the frame size sensor S1 and its number is counted.

If the frame size signal 12a represents "3", the width of the negative-carrier variable slit 54 is set to 38 mm, and the width of the variable paper mask 48 is set to 119 mm. Thereafter, the print paper 46 is moved, and the photographic film 1 is printed, after which the control sequence is ended. The print paper 46 is moved for a distance corresponding to printed frame sizes, a blank surrounding the printed frames, and a cutting blank between the printed frames. Usually, a hole is defined in the cutting blank when the photographic film 1 is printed, and serves as a positional signal for automatically cutting the print paper.

If the frame size signal 12a represents "4", the width of the negative-carrier variable slit 54 is set to 51 mm, and the width of the variable paper mask 48 is set to 158 mm. Thereafter, the print paper 46 is moved, and the photographic film 1 is printed, after which the control sequence is ended.

If the frame size signal 12a represents "1" or "2", the widths of the negative-carrier variable slit 54 and the variable paper mask 48 are set similarly. Thereafter, the print paper 46 is moved, and the photographic film 1 is printed, after which the control sequence is ended.

Since the frame size signal 12a is recorded in the upper marginal edge portion of the photographic film 1, it may possibly be recognized in error as the central mark 40a. To avoid such an error, a negative feed sensor S3, shown in FIG. 11, for detecting the distance by which the photographic film 1 is fed is associated with the film feed motor M1, and the distance by which the photographic film 1 is fed is measured by a counter 65 whose count is fed back to the microprocessor 64. Since the width of the frame size signal 12a on the photographic film 1 can be detected by the distance by which the photographic film 1 is driven, the frame size signal 12a can be distinguished from the central mark 40a or the frame number 41a.

As described above with reference to FIGS. 10, 11, and 12, the automatic printer according to the present invention has a film drive control device 65, 64, M1 for detecting an effective exposure area position signal 40a recorded in a marginal edge area between the effective exposure area 20 on the photographic film 1 and the marginal edge thereof to control the driving of the photographic film 1, and a printing opening width control device 54, 64, M2 for detecting an effective exposure area width indicating signal 12a recorded in the marginal edge area to control the width of the printing opening along the photographic film 1.

The photographic film 1 has an effective exposure area position signal 40a and an effective exposure area width indicating signal 12a which are recorded in a marginal edge area between the effective exposure area 20 on the photographic film 1 and the marginal edge thereof. After the effective exposure area width indicating signal 12a has been detected, the effective exposure area position signal 40a is detected. The width of the film exposure opening along the photographic film 1, the width of the print paper exposure opening, and the distance by which the print paper 46 is driven are controlled based on the detected effective exposure area width indicating signal 12a, and the distance by which the photographic film 1 is fed is controlled based on the detected effective exposure area position signal 40a.

Therefore, since the distance by which the photographic film 1 is driven is controlled based on the effective exposure area position signal 40a recorded in the marginal edge area of the photographic film 1 and the width of the printing opening, the width of the print paper exposure opening and the distance over which the print paper 46 is driven are controlled based on the effective exposure area width indicating signal 12a recorded in the marginal edge area of the photographic film 1, the photographic film 1 can automatically be printed even if it has a succession of frames of different sizes.

Figure 16:
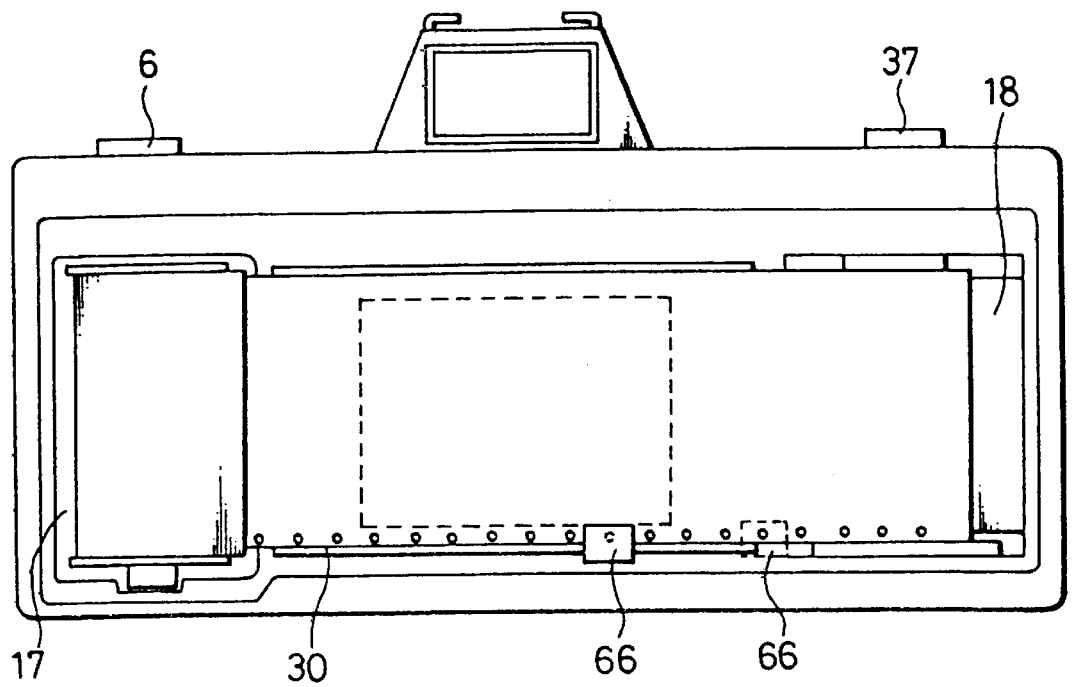
FIG. 16 is a rear elevational view of a 35-mm photographic camera with a rear lid removed, according to another embodiment of the present invention.
Figure 17:
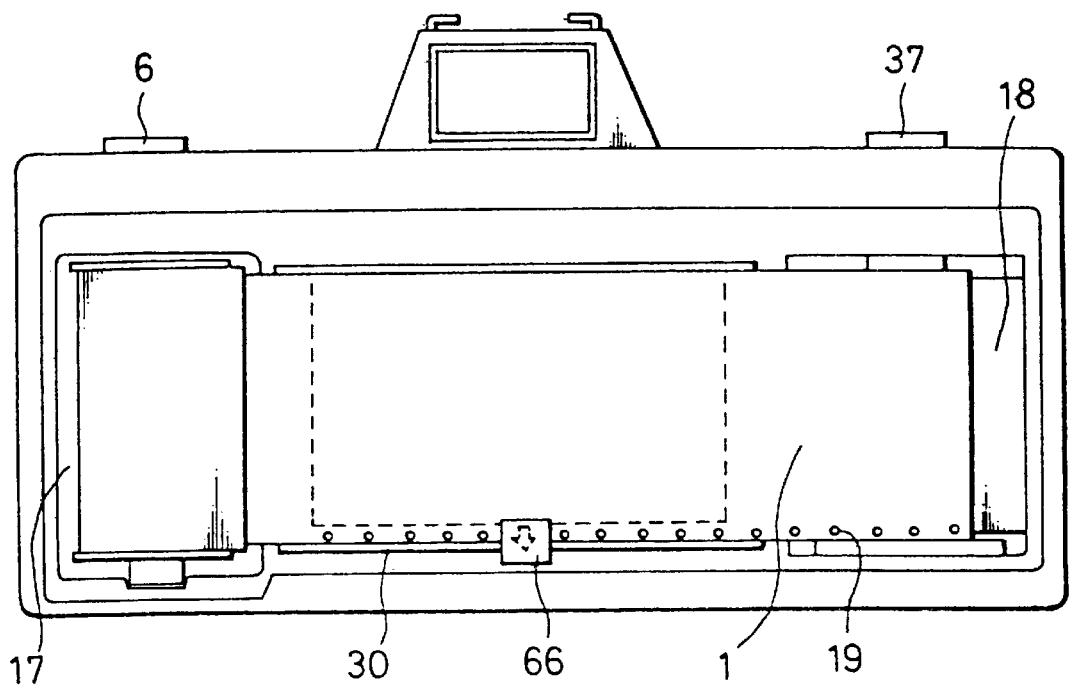
FIG. 17 is a rear elevational view of a 35-mm photographic camera with a rear lid removed, according to still another embodiment of the present invention.

In the illustrated photographic camera, the LED 5a and the photodetector 5b are disposed in confronting relationship to each other for detecting the film position detecting holes 19, however, as shown in FIGS. 16 and 17, a photocoupler 66, which is an integral combination of an LED and a photodetector for detecting a film position, may be disposed on a film guide 30. The photocoupler 66 may be positioned anywhere on the film guide 30. The photocoupler 66 may have LEDs 41, 40, as shown in FIG. 4, for recording the frame number 41a and the central mark 40a at the same time that the frame is exposed.

While the hole sensor 5 comprises an LED and a photodetector in the illustrated photographic camera, the hole sensor 5 may comprise two pairs of an LED and a photodetector given the different distances by which frames of different sizes are fed.

In the illustrated automatic printer, the same photographic film contain frames of different sizes, however, the present invention is also applicable to an automatic printer for automatically printing a spliced length of photographic films with different frame sizes.

Having described preferred embodiments of the invention with reference to the accompanying drawings, it is to be understood that the invention is not limited to those precise embodiments and various changes and modifications could be effected by one skilled in the art without departing from the spirit or scope of the present invention, as defined in the appended claims.

What is claimed is:

1. A photographic camera comprising:
    a first housing for accommodating a cartridge containing a photographic film strip, the photographic film strip having film positioning holes in a first marginal area thereof;
    a second housing for accommodating the photographic film strip drawn from the cartridge;
    a film feed device for feeding the photographic film strip between the first and second housings;
    a control circuit including a micro-computer electrically connected to a selector switch operable by a user; and
    a recording device connected to the micro-computer for recording a first information input using the selector switch on a second marginal area of the photographic film strip, wherein the recording device is located between a pair of guide rails to record the first information on the second marginal area of the photographic film strip, and the first information input using the selector switch is an image aspect ratio of an effective area on the photographic film.

2. The photographic camera according to claim 1, further including a hole detector to detect the holes in the first marginal area of the photographic film strip, the hole detector being located between the pair of guide rails.

3. The photographic camera according to claim 2, wherein the film feed device includes a motor, a takeup spool, and a guide roller to automatically position the photographic film strip between the first and second housings.

4. The photographic camera according to claim 3, wherein the motor is connected to the micro computer to feed the photographic film strip based on a signal output from the hole detector.

5. The photographic camera according to claim 2, wherein the hole detector is located towards the second housing.

6. The photographic camera according to claim 5, wherein the recording device is located towards the second housing.

7. The photographic camera according to claim 1, wherein the photographic film strip is devoid of sprocket holes, and the film feed device includes a motor, a takeup spool, and a guide roller to automatically position the photographic film strip between the first and second housings.

8. A photographic camera comprising:
    a first housing for accommodating a cartridge containing a photographic film strip, the photographic film strip being devoid of sprocket holes and having film positioning holes in a first marginal area thereof;
    a second housing for accommodating the photographic film strip drawn from the cartridge;
    a film feed device for feeding the photographic film strip between the first and second housings;
    a hole detector for detecting the film positioning holes and generating a hole detecting signal;
    a control circuit including a micro-computer electrically connected to the hole detector and a selector switch operable by a user, wherein the control circuit controls the film feed device in accordance with the hole detecting signal; and
    a recording device connected to the micro-computer for recording a first information input using the selector switch on a second marginal area of the photographic film strip, wherein the hole detector is located between a pair of guide rails to detect the film positioning holes on the first marginal area of the photographic film strip, and the recording device is located between the pair of guide rails to record the first information on the second marginal area of the photographic film strip, and the first information input using the selector switch is an image aspect ratio of an effective area on the photographic film.

9. The photographic camera according to claim 8, wherein the film feed device includes a motor, a takeup spool, and a guide roller to automatically position the photographic film strip between the first and second housings.

10. A photographic camera according to claim 9, wherein the motor is connected to the micro computer to feed the photographic film strip based on a signal output from the hole detector.

11. The photographic camera according to claim 8, wherein the film feed device includes a motor, a takeup spool and a guide roller to automatically position the photographic film strip between the first and second housings.

* * * * *